United States Patent [19]
Iwako

[11] 3,932,794
[45] Jan. 13, 1976

[54] REVOLUTION SPEED CONTROLLER USING BOTH ANALOG AND DIGITAL CONTROL

[75] Inventor: Hiroyuki Iwako, Tokyo, Japan

[73] Assignee: Funken Co., Ltd., Tokyo, Japan

[22] Filed: Feb. 20, 1975

[21] Appl. No.: 551,156

Related U.S. Application Data

[63] Continuation of Ser. No. 369,128, June 12, 1973, abandoned.

[52] U.S. Cl. ................ 318/318; 318/327; 318/317
[51] Int. Cl.² ......................................... H02P 5/06
[58] Field of Search ............ 318/318, 314, 326, 327

[56] References Cited
UNITED STATES PATENTS

| | | |
|---|---|---|
| 3,543,116 | 1/1970 | Haner .................................. 318/318 |
| 3,559,017 | 1/1971 | Dinger ................................ 318/318 |
| 3,559,018 | 1/1971 | Fournier ............................. 318/314 |
| 3,689,816 | 9/1972 | Matthey .............................. 318/327 |

Primary Examiner—B. Dobeck
Attorney, Agent, or Firm—Cooper, Dunham, Clark, Griffin & Moran

[57] ABSTRACT

A controller, such as for maintaining a selected constant rotational speed of a controlled unit, uses analog signals and circuits for fast coarse correction and uses slower digital signals and circuits for additional fine correction. A device is provided for conveniently and accurately changing the setting of the reference analog and digital signals used in the controller.

10 Claims, 4 Drawing Figures

REVOLUTION SPEED CONTROLLER USING BOTH ANALOG AND DIGITAL CONTROL

This is a continuation of application Ser. No. 369,128 filed June 12, 1973, now abandoned.

BACKGROUND OF THE INVENTION

One common technique used in process control is to set the desired value of a process parameter, to monitor the actual value of that parameter as the process is taking place, to compare the actual value of the parameter with the set value thereof in order to derive an error signal, and to correct the actual value of the parameter depending on the error signal in order to make it approach the set value and stay equal to it. For example, if the parameter of interest is the rotational speed of a shaft, the actual speed of the shaft is monitored, the monitored actual speed is compared with a set value and, depending on the difference, if any, the device which rotates the shaft is speeded up or is slowed down.

Process controls, and specifically revolution speed controls, are classifiable as analog and digital. For analog control, an analog signal representing the actual value of a monitor parameter is derived and is compared with an analog signal representing the set value of that parameter. The difference is an analog signal (often called an error signal) which is applied to a control device in order to make the monitored value approach the set value. Analog process control is usually fast, but it is sometimes not sufficiently accurate. In digital process control, the actual monitored value of the parameter of interest is expressed in digital form and it is compared with a digital representation of the set value. The difference between the monitored and the set values is a digital error signal which is utilized by a digital control device. Digital control is generally more accurate than analog control, but it is somewhat slower, and is sometimes more expensive to implement.

SUMMARY OF THE INVENTION

The invention is in field of process controllers, and relates specifically to a revolution speed controller which combines analog and digital controls. An additional feature of the invention relates to a device for conveniently changing the setting of analog and digital reference signals.

An object of the invention is to provide a revolution speed controller which uses analog control for fast coarse correction, and uses digital control for an additional fine control which may be slower but is more accurate. An additional object of the invention is to provide a device for conveniently and accurately changing the setting of analog and digital reference signals.

These and other objects of the invention are embodied in a revolution speed controller which comprises means for generating a monitored analog signal reflecting the current value of the rotational speed of a unit, and a monitored digital signal reflecting the same current value of the rotational speed of the same unit. Means are provided for generating a reference analog signal and a reference digital signal. The monitored analog signal and the reference analog signal are compared to generate an analog error signal which is applied to a control device that immediately starts the correction indicated by the analog error signal. Meanwhile, the monitored digital and the reference digital signal are compared by a suitable network including counters and a digital comparator to provide a digital error signal. The digital error signal is combined with the analog error signal to make, if necessary, an additional fine correction.

A device is provided for conveniently and accurately changing the setting of the reference signals. The device includes a modified version of the means for generating a reference analog signal and of the counter forming a part of the means for comparing the reference digital signal with the monitored digital signal.

DETAILED DESCRIPTION

The invention is described as embodied in a process controller for maintaining the rotational speed of a follower unit at a selected value, but it should be clear that it is applicable to controlling other processes.

Figure 1:
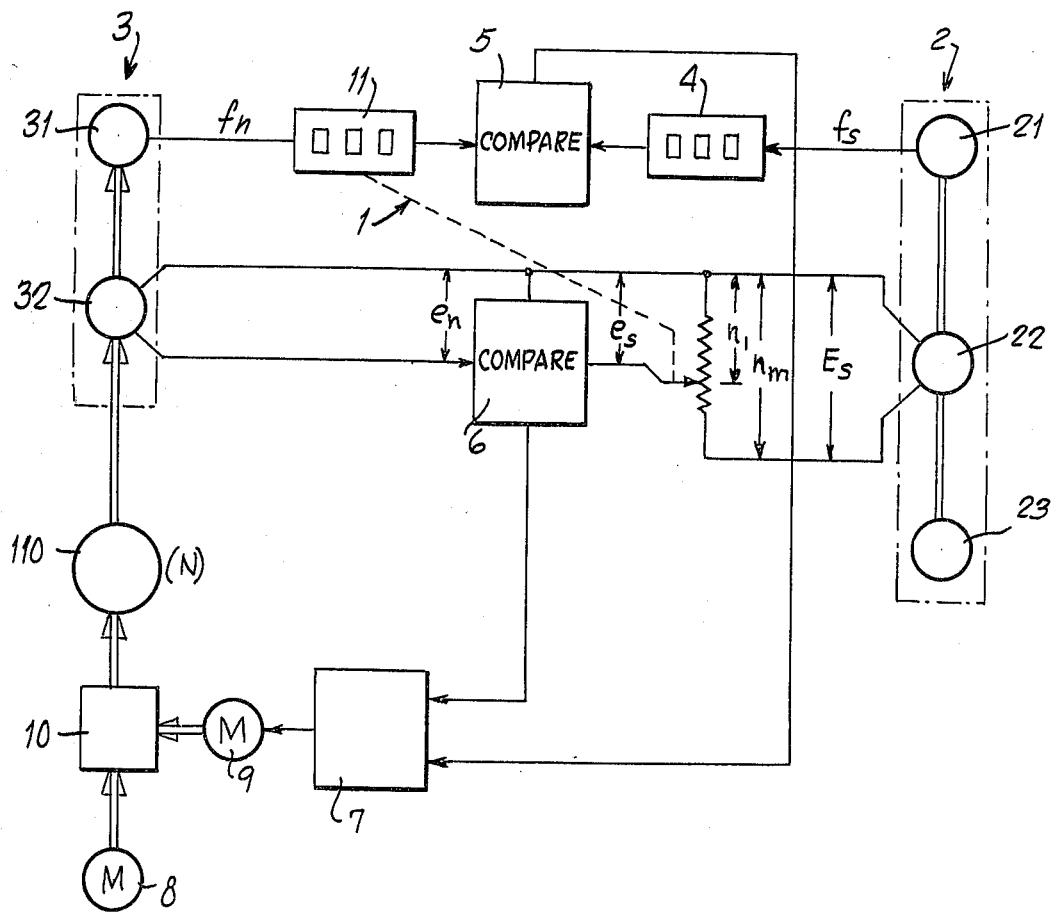
FIG. 1 is a schematic view of a revolution speed controller according to the invention.

Referring to FIG. 1, a follower unit 110 is rotated by a motor 8 through an adjustable change gear 10. The motor 8 operates at a constant speed and the rotational speed of the follower unit 10 may be varied by adjusting the change gear 10. The change gear 10 is adjusted by a bidirectional operating motor 9 so as to speed up or to slow down the follower unit 110.

The parameter of interest, namely, the rotational speed of the follower unit 110, is monitored by a follower transmitter 3 which includes a digital signal transmitter 31 and an analog signal transmitter 32. The digital signal transmitter 31 may be a transducer which generates a series of pulses at a frequency that is directly proportional to the rotational speed of the follower unit 110; and the analog signal transmitter 32 may be a transducer generating an electrical signal whose voltage level is directly proportional to the rotational speed of the follower unit 110. For example, the digital signal transmitter 31 may comprise a conventional shaft encoder (not shown) incuding a perforated disc rotating with the follower unit 110 and interrupting the light impinging on a photocell at a rate that is directly proportional to the rotational speed of the follower unit 110. The analog signal transmitter may be any suitable transducer coupled with the follower unit 110 and may be for example, a coil (not shown) magnetically coupled with a suitable rotating portion of the unit 110 to generate an electrical signal whose voltage is directly proportional to the rotational speed of the unit 110.

The desired value of the monitored parameter is set by a reference transmitter 2 which includes a reference pulse transmitter 21, a reference voltage transmitter 22 and a reference signal setter 23. The reference pulse transmitter may be, for example, a voltage controlled or a crystal controlled oscillator which generates pulses at a selected fixed frequency, and the reference voltage transmitter may be a fixed voltage source. The level of the voltage signal from the reference voltage transmitter 22, and the frequency of the pulses from the reference pulse transmitter 21 are set by the reference signal setter 23.

The purpose of the illustrated network is to compare the signals from the follower transmitter 3 with the signals from the reference transmitter 2 and to generate error signals applied to an operating motor control 7 which determines, on the basis of the sense and level of the error signals applied to it, the direction and the amount by which the operating motor 9 should adjust the change gear 10.

The analog signal from the follower transmitter 32 and the reference signal from the reference voltage transmitter 22 and voltage divider 12 are compared by an analog comparator 6 which may be, for example, a differential amplifier. It is noted that the voltage signal which is applied to the analog comparator 6 from the reference voltage transmitter passes through a voltage divider 12 whose purpose is explained below.

The pulse signals from the follower transmitter 31 and from the reference transmitter 21 are compared with the help of digital counters 11 and 4 and a digital comparator 5. Each of the counters 11 and 4 may be a binary counter, with the outputs of selected binary stages of each counter gated such that the counter provides an output signal to the comparator 5 only upon the accumulation of a selected number of pulses. The comparator 5 may be a gating network providing an output whose polarity depends on which of its two inputs arrives first, and whose duration is the difference between the arrival times of its two inputs. The output of the digital comparator 5 is applied to the operating motor controller 7, and serves as a fine adjustment of the error signal applied to the operating motor controller 7 from the analog comparator 6. The operating motor controller 7 includes a network (not shown) which translates the duration of the signal from the comparator 5 into a voltage signal and algebraically adds that voltage signal to the voltage signal applied to the operating motor controller 7 from the analog comparator 6. The difference between the two voltage signals is the fine adjustment, if any, which the operating motor controller 7 applies to the operating motor 9.

The network shown in FIG. 1 goes through a sequence of calibration cycles, each calibration cycle starting with the resetting of the counters 11 and 4 and the turning on of the comparators 5 and 6. Each cycle starts with a cycle start signal generated by the operating motor 9 and applied to the counters 4 and 11 to clear them, and to the comparators 5 and 6 to enable them. This cycle-start signal is generated when the operating motor 9 stops rotating.

The counter 11 and the voltage divider 12 are ganged such that the ratio between the voltage at the reference voltage transmitter 22 to the voltage that is actually appled to the analog comparator 6 (i.e., the ratio between the voltages $e_s$ to $e_n$) is the same as the ratio between the count at which the counter 4 provides an output signal to the comparator 5 and the count at which the counter 11 provides an output signal to the comparator 5. The ganged relationship between the voltage divider 12, which is in fact a variable resistor, and the counter 11 is such that the specified ratio is maintained as the resistance of the variable resistor 12 is changed.

In operation, before a calibration cycle starts, the counters 11 and 4 are reset to zero and the comparators 5 and 6 are disabled. At the start of a calibration cycle, pulses start accumulating in the counters 11 and 4 and the comparators 5 and 6 are turned on. As soon as the comparator 6 is turned on, it provides an analog error signal which reflects the sense and magnitude of the difference, if any, between the voltage signals applied to it from the follower transmitter 32 and the reference tranmitter 22 (through the voltage divider 12). This analog error signal is immediately utilized by the operating motor controller 7 to make the operating motor 9 rotate in the desired direction, if any, and by the desired amount to thereby adjust the changge gear 10 to speed up or slow down the follower unit 110 as necessary. Also at the start of the same calibration cycle, the counters 11 and 4 start accumulating pulses, and the first counter which accumulates the number of pulses to which it is set puts out a signal to the comparator 5. At that time the comparator 5 starts applying its output signal to the operating motor controller 7, the sense of this signal depending on which one of the counters 11 and 4 first accumulates its set number of pulses. The output signal from the comparator 5 to the operating motor controller 7 terminates when the second one of the counters 4 and 11 accumulates the set number of pulses. If the follower unit 110 rotates at exactly its desired speed, then the error signal from the analog comparator 6 should be zero, and there should be no error signal from the digital comparator 5. Any difference between the respective values of the error signals from the analog comparator 6 and from the digital comparator 5 is used as a fine adjustment of the correction provided on the basis of the error signal from the analog comparator 6 alone. That is, for each calibration cycle, the controller 7 algebraically adds the analog error signal from the comparator 6 and the voltage equivalent of the duration and sense of the error signal from the comparator 5 to generate an additional fine correction signal, if any, for the operating motor 9.

It may be desirable in some circumstances to change the desired speed of the follower unit 110, i.e., it may be desirable to change the set values applied to the comparators 5 and 6 from the reference transmitter 2. One way to do this is by changing both the reference voltage $e_s$ provided by the reference voltage transmitter 22 through the voltage divider 12 and by changing the frequency of the pulses provided by the reference pulse transmitter 21. However, changing the frequency of the pulses from the reference pulse transmitter 21 may not always be carried out very accurately or very conveniently. Therefore, in accordance with the subject invention, the change in the set value of the parameter of interest is accomplished simply, efficiently, and accurately by changing the voltage $e_s$ provided from the reference voltage transmitter 22 through the voltage divider 12 and simultaneously, in a ganged relationship, changing the setting of the counter 11 by a corresponding amount.

Figure 2:
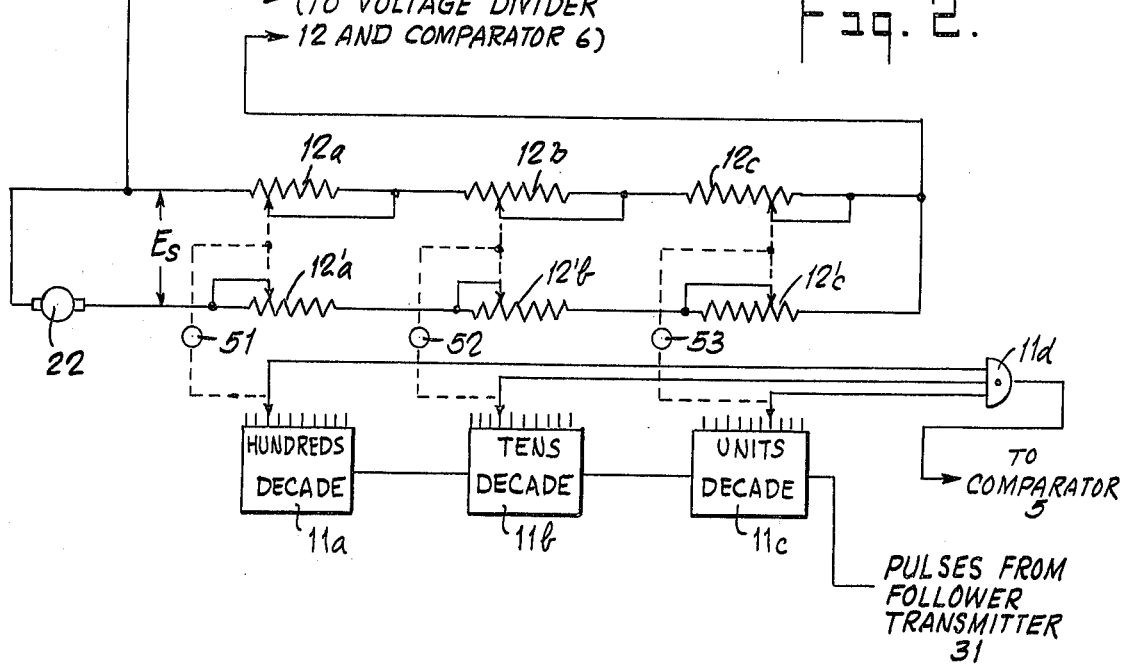
FIG. 2 is a circuit diagram of a device for chaning the setting of reference signals used in the embodiment of FIG. 1.

To do this, the counter 11 and the reference voltage transmitter 22 of FIG. 1 are replaced by the network illustrated schematically in FIG. 2. Referring to FIG. 2, the counter 11 is illustrated, for simplicity, as a decimal counter comprising three stages 11a, 11b, and 11c which are respectively the hundreds decade, the tens decade, and the units decade of the decimal counter 4. The reference voltage divider (potentiometer) 12 is shown as comprising resistors 12, 12b, 12c, 12'c, 12'b, and 12'a, which are connected in series across the constant voltage source $E_s$ of the transmitter 22. The voltage which is across the series connection of the resistors 12, 12b, and 12c is the voltage $e_s$ which is the reference analog voltage and is applied to the comparator 6 of FIG. 1.

Each of the resistors forming the reference voltage divider 12 shown in FIG. 2 is a variable resistor. The pair of variable resistors 12a and 12'a are ganged such that the sum of their resistances remains constant; the pair of resistors 12b and 12'b, and the pair of resistors 12c and 12'c are similarly ganged.

The counter 11 in FIG. 1 may be a decimal counter of the type shown in FIG. 2. In FIG. 2, the counter 11 comprises a hundreds decade 11a, a tens decade 11b and a units decade 11c. The units decade 11c receives pulses from the follower pulse transmitter 31, and carry connections are provided between the decades 11c and 11b, and between the decades 11b and 11a. Each of the decades 11a, 11b, and 11c has ten outputs, each output corresponding to the one of the stages of the decade. The outputs of the hundreds decade 11a are ganged with the moveable contacts of the resistors 12a and 12'a through a setting shaft 51 such that the output of the hundreds decade 11a which is applied as one input of an AND-gate 11d corresponds to the setting of the moveable contacts of the resistors 12a and 12'a. The tens decade 11b and the units decade 11b are similarly ganged with their corresponding resistors through setting shafts 52 and 53 respectively.

In operation, the setting of the shafts 51, 52 and 53 simultaneously sets the voltage which provides the analog reference signal $e_s$ and the setting of the counter 11 at which it provides a signal to the comparator 5 shown in FIG. 1. For example, assume that the variable resistors 12 and 12'a each have a maximum resistance of 900 units and are ganged such that the sum of their resistances, if they were to be placed in series is always 900 units, e.g., when the moveable contract of 12a is set such tht the resistance of 12a is 300 units, the moveable contact of 12'a is set such that the resistance of 12'a is 600 units. Assume that the resistros 12b and 12'b each have a maximum value of 90 units and are ganged in a similar manner, and that the resistors 12c and 12'c each have a maximum value of 9 units and are ganged in a similar manner. Then, the resistance which is across the voltage source $E_s$ is always 999 units, and the current through the series connection of the resistors is constant.

Also assume that the resistor 12a and the hundreds decade 11a are ganged through the shaft 51 such that the resistance of 12 is 100 units when the 100 output of the decade 11a is connected to the AND-gate 11d, that the resistance of 12a is 200 units when the 200 output of the decade 11a is connected to the AND-gate 11d, etc. Assume that the resistor 12b is ganged with the tens decade 11b through the shaft 52 in a similar manner, and that the resistor 12c is ganged to the units decade 11c through the shaft 53 in a similar manner.

Then, assuming that the voltage of the source $E_s$ is 9.99 volts, and that the AND-gate 11d is enabled when the counter 11 accumulates a count of 328 pulses from the pulse transmitter 31, the voltage $e_s$, which is the voltage across the series connection of the resistors 12, 12b, and 12c at that setting if the counter 11 is 3.28 volts. If the setting of the counter 11 is changed by rotating one or more of the shafts 51, 52, and 53, the voltagte $e_s$ is changed in a proportional manner. Thus, no human error can be introduced in changing the desired analog and digital signals in the circuit of FIG. 1.

Figure 3:
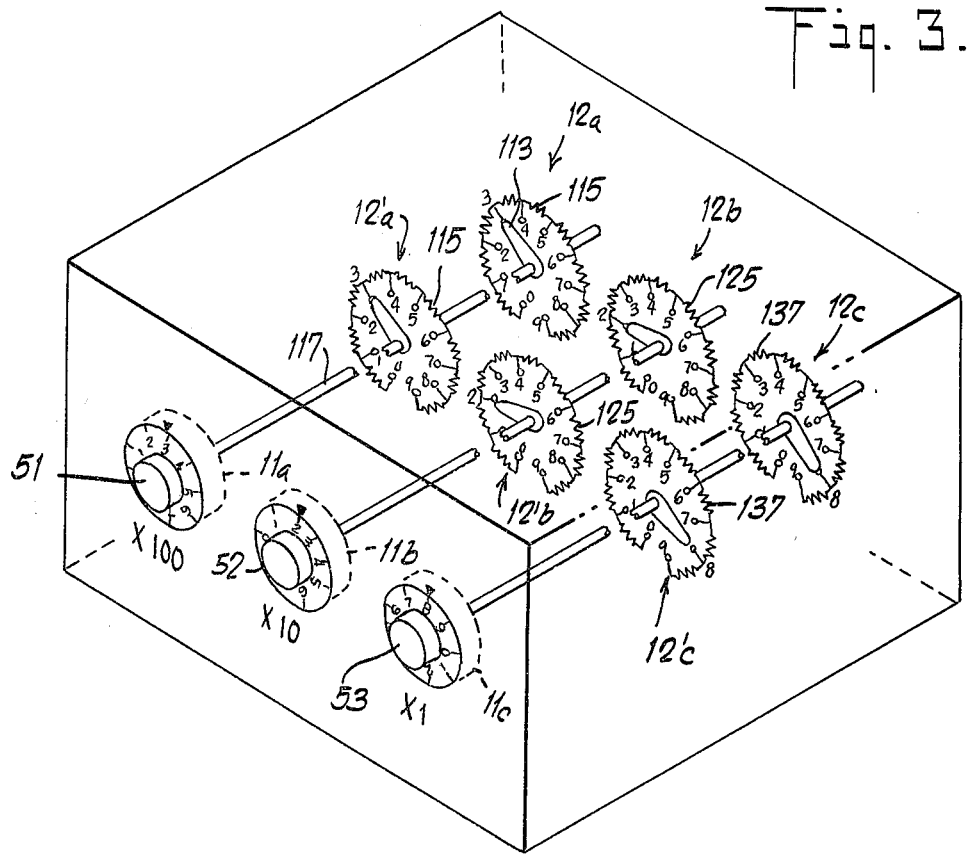
FIG. 3 is a perspective view of a device incorporating the circuit of FIG. 2.

An embodiment of the network schematically shown in FIG. 2 is illustrated in FIG. 3. Referring to FIG. 3, the variable resistor 12a consists of a series connection of resistors 115, each of which may have 100 units of resistance, and a moveable contact 113 is affixed to a shaft 117 that in turn is affixed to the setting shaft 51. The variable resistor 12'a is similarly constructed and similarly operated by the shaft 117. The remaining variable resistors are similarly constructed and similarly operated by the shafts 127 and 137 which are affixed to the setting shafts 52 and 53 respectively, except that the portions 125 of the resistors 12b and 12'b have resistance value of, for example, 10 units of resistance, and the portions 137 of the resistors 12c have resistance values of, for example, 1 unit of resistance. The decades 11a, 11b, and 11c of the counter 11 are operated by the setting shafts 51, 52, and 53 respectively in the manner discussed in connection with FIG. 2. The electrical connections are not shown in FIG. 3, these electrical connections being of the type shown and discussed in connection with FIG. 2.

Figure 4:
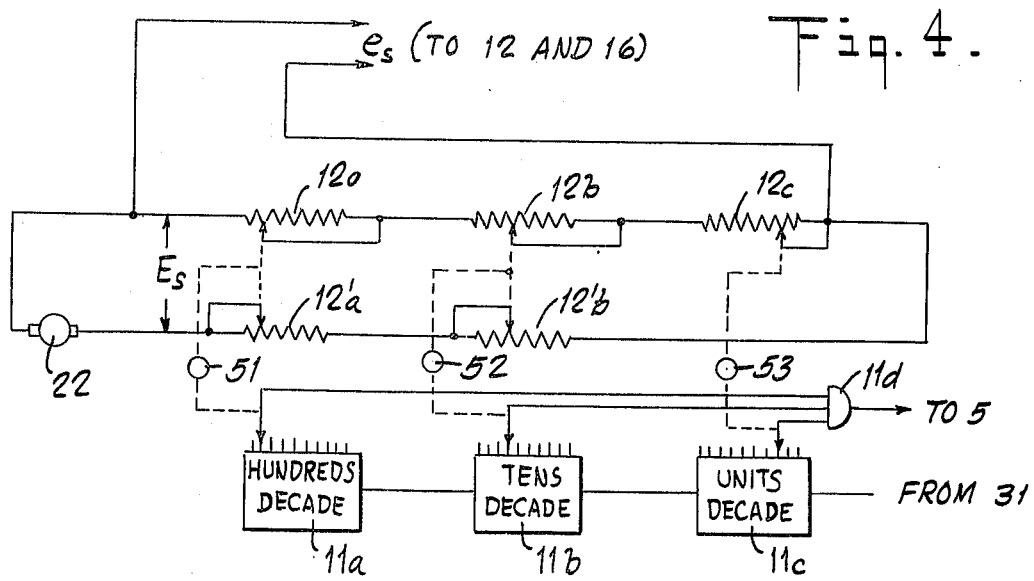
FIG. 4 is a circuit diagram of a modified device for changing the setting of reference signal of the type used in the embodiment of FIG. 1.

The purpose of having pairs of resistors 12a and 12'a, 12b and 12'b and 12 and 12'c is to keep the total resistance across the voltage source $E_s$ constant in order to assure constant drainage of the source $E_s$. However, it is possible to eliminate the resistor 12'c, because of the relatively low change due to varying the resistance of the variable resistor 12c. In the example discussed in connection with FIG. 2, the value of the resistor 12c changes from 0 to 9 units of resistance, as compared to the total possible resistance change of 0 to 999 units of resistance. When the resistor 12'c is eliminated from the network shown in FIG. 2, the result is the network shown in FIG. 4, which is otherwise identical to that of FIG. 2. The elements of the network shown in FIG. 4 are the same in structure and in operation as the correspondingly numbered elements of FIG. 2.

I claim:

1. A revolution speed controller for a rotatable follower unit having a defined range of operating revolution speeds, comprising:
    means for monitoring the revolution speed of the follower unit and for providing a monitored analog signal and a monitored digital signal each indicating the value of said revolution speed at a selected time;
    means for providing a reference analog signal and a reference digital signal of selected values indicating a desired revolution speed of the follower unit;
    means for comparing the monitored analog signal with the reference analog signal and for providing a first error signal reflecting the difference therebetween;
    means for comparing the monitored digital signal and the reference digital signal and for providing a second error signal reflecting the difference therebetween;
    wherein each of said first and second error signal ranges in value over substantially the entire range of the operating revolution speeds of the follower units; and
    means for combining the first and the second error signal to provide a combined control signal reflecting the difference, if any, between the two error signals, said control signal indicating the degree of correction needed to conform the actual revolution speed of the follow unit to the desired revolution speed thereof.

2. A revolution speed controller as in claim 1 wherein the means for providing a monitored digital signal and a reference digital signal each comprise means for generating a series of pulses whose frequencies indicate respectively the actual and desired speeds of said follower unit.

3. A revolution speed controller as in claim 2 wherein the means for comparing the two digital signals comprise a monitor counter receiving the monitored digital signal pulses and a reference counter receiving the reference digital signal pulses, each counter accumulating a count of the received pulses and each providing an output signal upon the accumulation of a selected number of pulses, and wherein the means for comparing the two digital signals comprise means for receiving the output signals of the two counters and for providing said second error signal reflecting the difference between the times at which said counter output signals are provided and reflecting the order in which the counter output signals are provided.

4. A revolution speed controller as in claim 3 wherein the means for combining the first and second error signals comprise means for receiving the first error signal and for providing a first control signal reflecting said first error signal, and means for receiving said second error signal and providing a second control signal reflecting the difference, if any, between the first and the second error signal.

5. A revolution controller as in claim 1 wherein the means for combining the first and the second error signal comprise means for receiving the first error signal and for providing a first control signal reflecting the value of said first error signal and means for receiving the second error signal, for combining it with the first error signal and for providing a second control signal reflecting the difference, if any, between the first and second error signal.

6. A revolution speed controller as in claim 1 wherein the means for providing a reference analog signal and a monitored digital signal comprise:
a monitored pulse generator providing pulses at a frequency which is function of the revolution speed of the follower unit;
a digital counter connected to count said pulses and having a plurality of outputs each providing an output signal upon the accumulation of a defined count in the counter;
counter output means connectable to selected outputs of the digital counter;
a variable voltage source providing an output voltage signal and means for selectively varying the level of said output voltage signal; and
setting means connected to the counter output means and to means for varying the output voltage signal to maintain a selected ratio between the count in the digital counter at which the counter output means provides an output signal and the level of the output voltage signal.

7. A revolution speed controller as in claim 1 wherein the means for monitoring the revolution speed of the follower unit and for providing a monitored digital signal includes a pulse generator providing pulses at a frequency which is a function of the revolution speed and a monitor counter for accumulating a count of said pulses and for providing an output upon the accumulation of a selected number of pulses, the means for providing a reference digital signal comprises a pulse generator providing pulses at a selected frequency and a reference counter for accumulating a count of the last recited pulses and for providing an output upon the accumulation of a selected count of pulses, the means for comparing the monitored digital signal and reference digital signal comprises a means for generating a signal whose duration reflects the difference, if any, between the generation of the output signals of the two counters and whose sense reflects the order in which said counter output signals are generated, said last recited signal being said second error signal, and wherein the means for combining the first and second error signal includes means for algebraically adding a representation of each of said first and second error signal to provide said combined control signal.

8. A revolution speed controller as in claim 7 including setting means for selectively setting the accumulated count at which the monitor counter provides an output and for setting the level of the reference analog signal to maintain a selected ratio between the set count and the set reference analog signal.

9. A process controller comprising:
means for monitoring a process parameter ranging in value over a selected operating range and for providing a monitored analog signal and a monitored digital signal each indicating the value of said process parameter at a selected time;
means for providing a reference analog signal and a reference digital signal of selected values each indicating a desired value of said process parameter;
means for comparing the monitored analog signal with the reference analog signal and for providing a first error signal reflecting the difference therebetween;
means for comparing the monitored digital signal and the reference digital signal and for providing a second error signal reflecting the difference therebetween,
each of said first and second error signal ranging in value over the entire operating range of said process parameter; and
means for combining the first and second error signal to provide a combined control signal reflecting the difference, if any, between the two error signals, said difference indicating the degree of correction needed to conform the actual to the desired value of said process parameter.

10. A process controller as in claim 9 wherein the monitored digital signal is a pulse train whose frequency represents the value of the monitored process parameter, and the means for providing a monitored digital signal includes a digital counter providing an output at the accumulation of a selected number of pulses forming said pulse train, and including means for setting the number of pulses at which said counter provides an output and for setting the level of said reference analog signal at a selected ratio between the number of pulses at which said counter is set and the level at which the analog signal is set.

* * * * *